Oct. 16, 1962    I. KOVÁSZNAY ET AL    3,058,829
METHOD FOR PEELING AND PROCESSING SOY
BEANS AND APPARATUS THEREFOR
Filed March 12, 1959
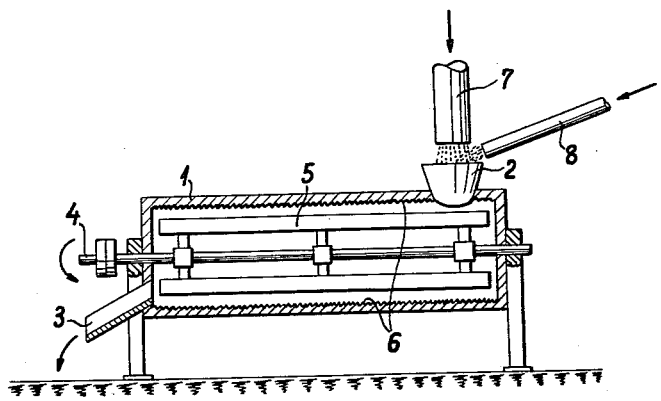
INVENTORS
ISTVÁN KOVÁSZNAY
ERZSÉBET KOVÁSZNAY NÉE TROYKO
BY Irwin S. Thompson
ATTY.

United States Patent Office 3,058,829
Patented Oct. 16, 1962

3,058,829
METHOD FOR PEELING AND PROCESSING SOY BEANS AND APPARATUS THEREFOR
István Kovásznay and Erzsébet Kovásznay, née Troyko, Budapest, Hungary; Elizabeth (Erzsébet) Troyko, heir of said István Kovásznay
Filed Mar. 12, 1959, Ser. No. 799,024
Claims priority, application Hungary Mar. 18, 1958
2 Claims. (Cl. 99—98)

It is known that soy beans, in order to be apt to use in human food products have to be completely freed of their hulls and furthermore are to be freed of their bitter substances by non-chemical treatments. By this process, however, the biological value of proteins must not be impaired. Satisfactory results could not be achieved by means of the conventional methods. Whether the soy beans were mechanically treated in dry condition, or with a combination of dry and wet operations, the peeling, shelling or scouring of the hulls had a destructive effect to the surface cells of the cotyledons, it caused the opening of the oil inclusions and the ensuing rancidification of the goods so treated as well as early decomposition of their protein content. Thus, it proved impossible to attain faultless husking of angular, flat, kinked or otherwise distorted beans even by processes in which the beans are soaked in chemicals and peeling is performed between rubber rollers.

The invention relates to a process by which improved soy beans free of hulls, of bitter ingredients and other ingredients of unpleasant flavour can be produced, without resorting to chemical substances. Such soy beans have a rather long storage stability.

By the new process, the drawbacks of the known processes are avoided.

According to the invention soy beans are subjected to the effect of steam but—contrary to the known processes—for a rather short period of 2 to 5 minutes only, and then suddenly cooled with cold water in a known manner whereafter the hulls so loosened are disrupted in a closed vessel by means of streaming, preferably swirling water, the hulls together with the embryos are separated from the cotyledons and finally the beans free of hulls and embryos are dryed at elevated temperatures preferably in the range of 70 to 75 centigrades.

According to the invention, the hydrodynamic separation and the removal of the embryos is effected in an apparatus comprising a horizontally disposed vessel into which the steamed and cooled beans are introduced together with a stream of water and from which the beans, the hulls and the embryos are discharged together with the water stream. Said vessel is provided with a rotating shaft carrying beater blades connected with the shaft by means of spokes. The inner wall surfaces of the drum or vessel are coarsened that is rilled, grooved, hatched, wire-netted etc. in a known manner. Similar beater drums are known in other fields of manufacture, for instance in the milling industry. It is not known however to introduce the goods to be treated into said drum together with a stream of water, to utilize the hydrodynamical force of streaming water for a separation of the hulls and embryos from the cotyledone, and to remove the separated bean components from the drum in or by means of the water stream.

The beans stripped in this manner are fully free of hulls and embryos, irrespective of their shape. The appearance and quality of the goods thus obtained is far better than that obtained by means of conventional processes, their edges being undamaged and their surface cells having not suffered any destructive effect. In consequence of the hydrodynamical peeling, the beans are not subjected to any detrimental effect. The loss in useful substances is negligible, the improved goods can be employed for any purpose and may be pressed for oil in the cold.

The effect of the quick preliminary steaming, consists in a diffusion through the hulls, whereby the steam penetrating between hull and cotyledon and the water condensing therein, causes the loosening of the hulls on the beans. The coefficient of expansion of the woody hull and of the cotyledon being different, the hulls separate from the beans. Moreover, the cells of the hull expand on the effect of the hot steam whereby their diffundability is increased.

The heating, effected according to the invention for a rather short period only, is restricted to the superficial cells in contradistinction to the known processes carrying out a longer steaming. The removal and conversion of the detrimental bitter ingredients and of other substances of unpleasant taste is effected, on the one hand mechanically in the course of the special peeling procedure, and on the other hand, chemically by means of the subsequent hot drying. In some special cases—inasmuch as the hulling or other operations should not yield a high-grade product—the whole process may be repeated.

The peeled product is similar to peeled split peas, in consequence of the fact that the cotyledons are falling apart in two halves of the course of the peeling, and are freed from the embryos, which latter generally cause trouble in processing soy beans for food. The removal of the embryos is effected simultaneously with the hulls and can be separated from the same in a known manner, for instance with separators.

An apparatus for carrying out the process according to the invention is schematically illustrated on the drawing by way of example. The horizontal cylindrical vessel or drum 1 is provided with a feeding funnel 2 and an exit conduit 3. The rotating shaft 4 carries longitudinal beater blades 5 connected to the shaft by means of three groups of spokes 9. The inner surface 6 of the vessel 1 is coarse. The pretreated beans are fed through tube 7 and the water conducted through pipe 8 into the feeding funnel 2. It is however possible to feed the beans to the vessel together with the water, directly from the cooling apparatus.

According to the invention, soy beans are subjected for 2 to 5 minutes to the effect of steam at a temperature below 100° centigrade and directly thereafter, suddenly cooled in cold water. The beans thus treated are introduced with a stream of water into the closed peeling vessel 1 in which the water is compelled to a whirling movement by means of the blades 5. The hulls of the beans in water are split up on effect of the swirling water by which the beans are thrown against the interior walls of the vessel. The walls can be for instance covered for said purpose with a wire net. By means of the hydrodynamic force of the streaming water the split hulls are stripped off the beans and upon this action, the embryos separate from the cotyledons which latter separate into halves. The beans are separated from the hulls and embryos and from the water in a known manner and thereafter dried according to the invention in a drying apparatus at about 70 to 75° centigrade.

The bitter ingredients and those of unpleasant taste of the stripped bean halves are decomposed in consequence of the heating, this heating is effected in all cases for such a short time that the beans cannot be denaturalized, that is to say they do not taste cooked or roasted.

What we claim is:

1. A process for peeling and processing soy beans comprising the steps of subjecting the soy beans to the action of steam at a temperature below 100° C. for a period or two to five minutes to loosen the hulls of the soy beans, suddenly cooling the steamed soy beans, introducing the cooled soy beans along with water into a closed space, agitating the water in said closed space to cause the bean cotyledons to separate from the hulls and embryos of the soy beans by means of hydrodynamical force, removing the separated bean cotyledons, hulls and embryos from said closed space, separating the bean cotyledons from the hulls and embryos, and drying the bean cotyledons at a temperature of 70 to 75° C. to decompose the bitter ingredients and unpleasant taste of the bean cotyledons.

2. A process according to claim 1 in which said closed space has a coarse inner surface to aid in separating the bean cotyledons from the hulls and embryos of the soy beans.

References Cited in the file of this patent

UNITED STATES PATENTS

| | | |
|---|---|---|
| 669,726 | Fuller | Mar. 12, 1901 |
| 1,570,081 | Ross | Jan. 19, 1926 |
| 2,083,853 | McComb | June 15, 1937 |
| 2,148,142 | Wait | Feb. 21, 1939 |
| 2,166,652 | Zinsser | July 18, 1939 |
| 2,172,699 | Cohn | Sept. 12, 1939 |